US 6,668,337 B2

(12) United States Patent
Takahashi et al.

(10) Patent No.: US 6,668,337 B2
(45) Date of Patent: Dec. 23, 2003

(54) METHOD FOR DESIGNING INTEGRATED CIRCUIT BASED ON THE TRANSACTION ANALYZING MODEL

(75) Inventors: Miwaka Takahashi, Kyoto (JP); Akira Motohara, Hyogo (JP); Osamu Ogawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 32 days.

(21) Appl. No.: 09/864,285

(22) Filed: May 25, 2001

(65) Prior Publication Data

US 2002/0004927 A1 Jan. 10, 2002

(30) Foreign Application Priority Data

May 25, 2000 (JP) ........................................ 2000-154707

(51) Int. Cl.[7] .............................................. G06F 17/50
(52) U.S. Cl. ................... 714/6; 716/2; 716/10; 716/12; 716/18; 703/14; 703/15; 703/16; 703/17
(58) Field of Search ................................ 716/1, 12, 18, 716/2, 5, 7, 8; 703/14, 15; 341/120

(56) References Cited

U.S. PATENT DOCUMENTS

| | | | |
|---|---|---|---|
| 5,648,910 A | 7/1997 | Ito | |
| 5,831,864 A | 11/1998 | Raghunathan et al. | |
| 6,086,628 A | 7/2000 | Dave et al. | |
| 6,321,185 B1 * | 11/2001 | Takahashi | ..................... 703/15 |
| 2001/0016933 A1 * | 8/2001 | Chang et al. | .................. 716/1 |

* cited by examiner

Primary Examiner—Matthew Smith
Assistant Examiner—Yelena Rossoshek
(74) Attorney, Agent, or Firm—McDermott, Will & Emery

(57) ABSTRACT

Architecture design (AD), architecture floorplanning (AF), and transaction analysis (TA) are performed before transaction-analysis-based floorplanning (TF). Then, area estimation (CE) is performed on functional parts and connections before area-based floorplanning (CF) and area optimization (CO) are performed, and whether or not the area specifications area satisfied or not is validated (CR). Besides, power consumption estimation (PE) is performed to check whether or not the power consumption specifications are satisfied (PR). In the case of taking a parallelization approach to realize lower power consumption, parallelization design (PD) is performed. After the power consumption specifications are satisfied, power supply wiring/floorplanning is performed.

24 Claims, 15 Drawing Sheets

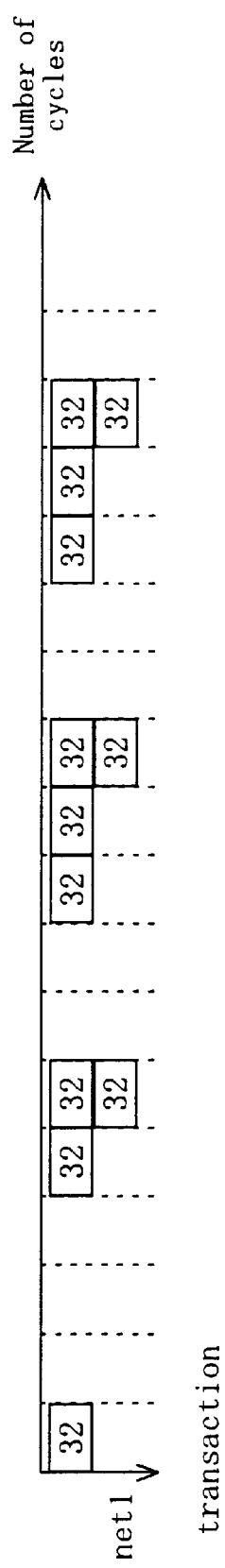
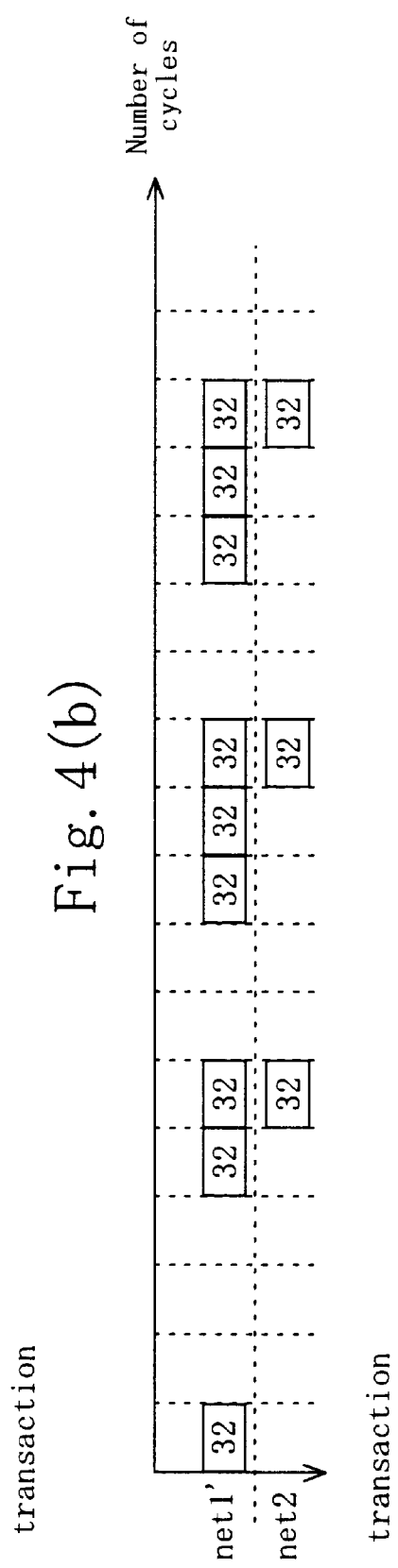

Transaction Analyzing Model (compression Part)
Deta compression rate(%)      0      20     40     80
Frequency of occurrence(%)    5      10     80     5

Fig. 10

Example of Application

| Function | Transaction amount | Operating frequency | Number of cycles | | Area |
|---|---|---|---|---|---|
| | $\alpha$ | $\beta$ | $\gamma$ | | $\tau$ |
| Multiplier | 128 | 50 | 1 | → | 1 |
| | 128 | 100 | 1 | → | 2 |
| | 128 | 100 | 2 | → | 1 |
| | 256 | 100 | 2 | → | 2 |
| | 256 | 50 | 4 | → | 1/2 |

Fig. 11

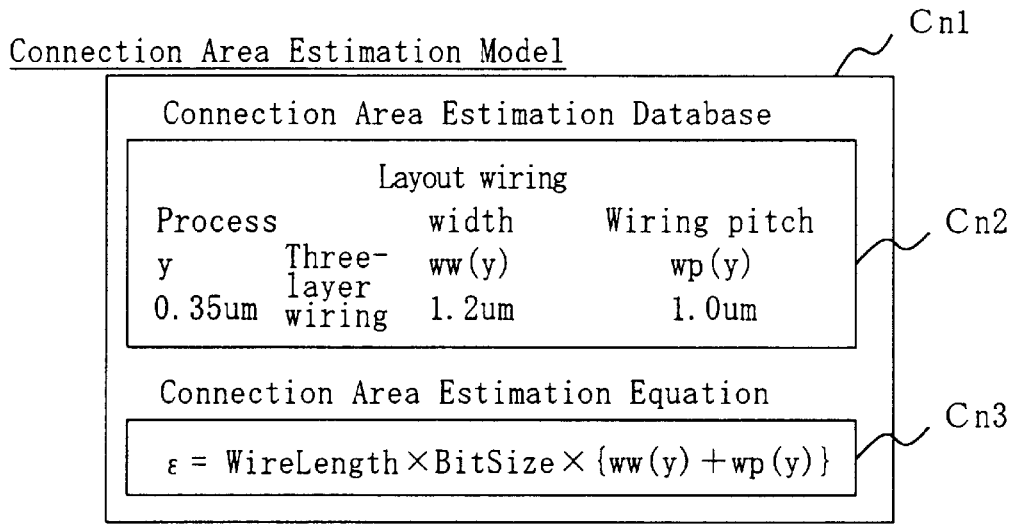

Connection Area Estimation Model — Cn1

Connection Area Estimation Database

| | Layout wiring | |
|---|---|---|
| Process | width | Wiring pitch |
| $y$ | $ww(y)$ | $wp(y)$ |
| 0.35um Three-layer wiring | 1.2um | 1.0um |

— Cn2

Connection Area Estimation Equation $\varepsilon = \text{WireLength} \times \text{BitSize} \times \{ww(y) + wp(y)\}$ — Cn3

Fig. 15(a)
```
func (a, b, in0, in1, in2, in3, in4, out) {
 int x;
 If (a == b) {
     x = in0 + in1;
 } else {
     x = in0 + in1 + in2;
 }
 out = x;
}
```
Fig. 15(b)
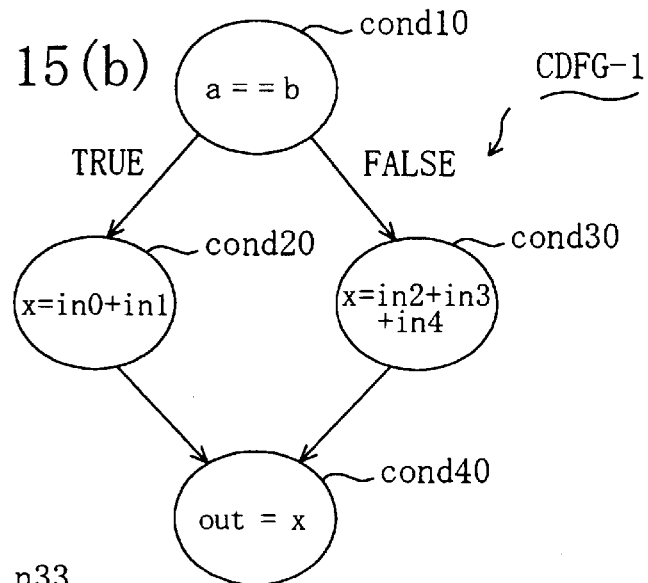
Fig. 15(c)
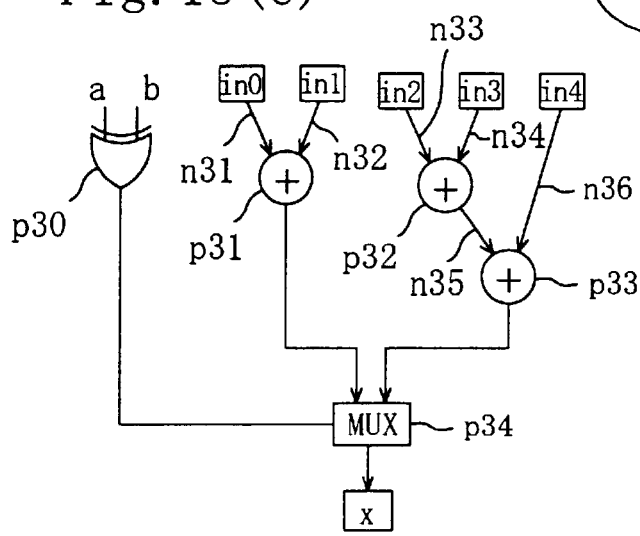

Fig. 16(a)
```
func (a, b, in0, in1, in2, in3, in4, out) {
  int x;
  If (a == b) {
      x = in0 + in1;
  } else {
      t = in3 + in4;
      x = in2 + t;
  }
  out = x;
}
```
Fig. 16(b)
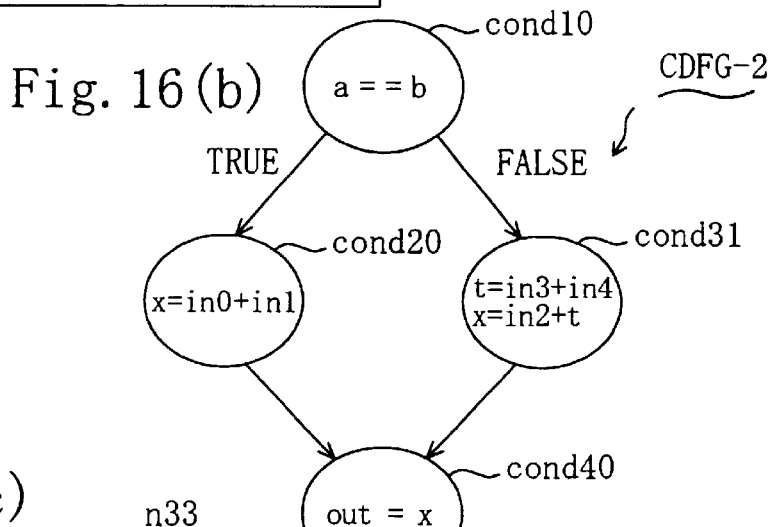
Fig. 16(c)
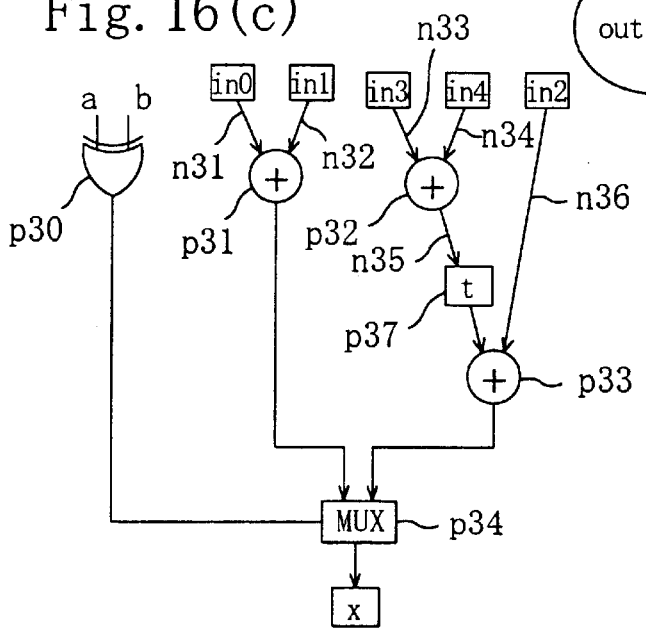

| Net | Maximum operation range (bit) |
|---|---|
| n31 | 8 |
| n32 | 8 |
| n33 | 6 |
| n34 | 6 |
| n35 | 7 |
| n36 | 8 | fIG. 19

| Element | Number of toggles |
|---|---|
| p 31 | 10 |
| p 32 | 20 |
| p 37 | 10 |
| p 33 | 10 | fIG. 20

| Element | Size (bit) | Energy consumption |
|---|---|---|
| p 31 | 8+8 | 10 |
| p 32 | 6+6 | 5 |
| p 37 | 7 | 15 |
| p 33 | 8+8 | 10 |

METHOD FOR DESIGNING INTEGRATED CIRCUIT BASED ON THE TRANSACTION ANALYZING MODEL

BACKGROUND OF THE INVENTION

The invention relates to a method of designing an integrated circuit such as a system LSI, and more particularly to design measures to reduce power consumption through the realization of a floorplan that incorporates a transaction analysis at an upper level.

In recent years, power consumption associated with enhancing functions and performance of integrated circuits such as a system LSI has been regarded as of importance. The reason is that the power consumption of integrated circuits significantly influence costs or the product value of battery, packages, and so on. This means there is an increasing need for a power consumption analysis for the sake of low power design.

Now, an integrated circuit such as a system LSI is designed along a large flow including system design, RTL design, floorplan synthesis, arrangement, and wiring/validation, being realized step by step. Then, after the arrangement and wiring of circuit elements are realized, it becomes possible to estimate (analyze) the power consumption of the integrated circuit. Here, letting C, f, and V stand for the capacitance, frequency, and voltage, respectively, the power consumption P is given by the following equation (1):

$$P = K \cdot C \cdot F \cdot V^2, \quad (1)$$

where K is transition probability.

Of the parameters on the right side of the equation (1), the voltage V is determined by the design specifications. The frequency can be grasped at the stage of designing the functions and logic of the integrated circuit. The capacitance C can be estimated from the areas of the individual devices and those of the wires on the integrated circuit when the arrangement and wiring are determined.

Thus, the estimation of power consumption of conventional integrated circuits at the designing stage is typically performed after the completion of the temporary arrangement and wiring, or actual arrangement and wiring. After the power consumption is estimated, designing is repeated for optimization so that integrated circuits of low power consumption type are designed finally.

With the advent of system LSIs and other large-scale integrated circuits as in recent years, however, considerable amounts of time have come to be expended not only in the optimization of power consumption but also in the estimation of power consumption. In particular, image-handling applications with enormous input data are on the increase recently. Besides, identical circuits vary in power consumption while executing different applications. On that account, the power consumption analysis in the automatic designing of integrated circuits has become increasingly complicated, with a tendency of the period involved in the analysis to be longer. Consequently, at the moment, any technique actually available for the power consumption analysis at the automatic designing stage is not proposed yet.

Then, power consumption could be estimated at the upstream side before the arrangement and wiring so that the power consumption estimation at the designing stage is performed with higher efficiency. This would require only that each parameter on the right side of the equation (1) be estimable at the upstream designing stage.

Under present circumstances, however, there is provided no means appropriate for the upstream-side estimation of the capacitance C among the parameters in the equation (1). At this point, the present inventors have reached a conception of utilizing a transaction analytical technology for analyzing power consumption.

Conventionally, the transaction analytical technology has been used chiefly in designing a large-scale network system. In a network system, individual terminals connected to fragmented communication networks actively utilize the communication networks, basically without any mechanism for integrated control over the communication networks. Accordingly, when constructing a network system, it has been necessary to examine the throughput of the communication networks under assumed situations of utilization. It is the transaction analytical technology that has been used as a method of "assuming the situations of utilization."

Nevertheless, the conventional transaction analysis includes no function of validating the logic of data communicated within such a large system. The conventional transaction analytical technology is an analytical technology to grasp only the occurrence, flow, and disappearance of transactions for the sake of analyzing the transactions that cause a decrease in throughput, or the degree of congestion of processes.

Meanwhile, as devices and circuit elements get finer with the recent advances of process technologies, LSIs are growing in functionality and performance. As a result, it has become increasingly difficult to develop multifunction, high-performance LSIs by market-demanded time without introducing reuse design techniques for making effective use of existing parts into LSI design. An LSI constructed through such reuse design techniques may be regarded as a network system. That is, in the LSI, reused parts with desired functions are connected to the backbone wiring, or a communication network within the LSI. These reused parts correspond to terminals. Then, the individual reused parts actively utilize the backbone wiring to transmit data to each other for processing, to achieve their desired objectives.

Nonetheless, the transaction analytical technology has not been used for power consumption analysis heretofore. The following are two possible reasons for this. One is the significance of power consumption, and the other lies in the content of the transaction processing.

Initially, description will be given of the implication of power consumption. In network systems, the terminals connected to communication networks are dispersed physically. Besides, the communication networks for connecting the terminals are made of materials having lower electric resistances. Therefore, in the network systems, the power consumption of the entire systems has mattered little. That is, there has been no motivation to use the transaction analytical technology for analyzing power consumption.

Now, turn to the content of the transaction processing. In network systems, the transaction amount output from a function for performing certain processing depends on a transaction amount input and the frequency of data input. On the other hand, a system LSI performs not only such processing as described above, but also compression, expansion, and other processing in which the transaction amount to be output may vary greatly with input data properties. Introducing these transaction amount variations resulting from differences in data property into the analysis of power consumption requires some model, whereas such a model itself is not yet in existence.

SUMMARY OF THE INVENTION

An object of the present invention is to provide a method of designing an integrated circuit, in which a model capable of utilizing a transaction analytical technology for analyzing power consumption can be established to allow easy and efficient consideration for lower power consumption.

A method of designing an integrated circuit in the present invention comprises the step of performing a transaction analysis by using a transaction analyzing model including a database for storing a transaction amount in an integrated circuit to be designed, the transaction amount being expressed as events in a statistical distribution.

According to this method, a high-speed analysis can be made in performing a power consumption estimation within a realistic time with an eye to the fact that transactions well reflect the frequencies of operations in an integrated circuit.

The transaction analyzing model is to select a plurality of transaction amounts and frequencies of occurrence based on the statistical distribution. This allows a selection for efficient use of design resources.

The database of the transaction analyzing model stores a normal distribution as the statistical distribution. Therefore, the transaction analyzing model can be created easily.

The transaction analysis is performed by executing an application and extracting the statistical distribution. Therefore, high-precision high-speed analyses can be made by using the transaction analyzing model that allows analyses conforming to reality.

Another method of designing an integrated circuit in the present invention comprises the step of optimizing the area of hardware by using a hardware area estimation model including a hardware area estimation database storing a transaction amount, the number of processing cycles, an operating frequency, and an area of each hardware function of an integrated circuit to be designed.

According to this method, it becomes possible to calculate the area of hardware based on existing information, at an earlier stage of designing.

The hardware area estimation database stores a basic transaction amount, the basic number of processing cycles, a basic operating frequency, and a basic area of each hardware function. The hardware area estimation model further includes an area calculating equation for calculating an area from the basic transaction amount, the basic number of processing cycles, the basic operating frequency, the basic area, a desired transaction amount, the number of processing cycles desired, and a desired operating frequency. Therefore, whether a hardware area calculated is appropriate or not can be decided quickly.

The hardware area estimation model further includes a correction factor for correcting the area calculating equation, the correction factor being determined from the desired transaction amount and the area calculated. This makes it possible to perform the estimation of hardware areas with high precision.

Another method of designing an integrated circuit comprises the step of performing a power consumption analysis by using a hardware power consumption estimation model which includes: a power consumption estimation database for storing per-transaction energy and a correction factor of each hardware function of an integrated circuit to be designed; and a power consumption calculating equation for calculating power consumption from the energy and correction factor in the power consumption estimation database, a desired transaction amount, a desired operating frequency, and a transaction inversion rate.

According to this method, it becomes possible to calculate power consumption quickly with an eye to the point that transaction amounts and their inversion rates well reflect power consumption.

The transaction inversion rate in the hardware power consumption estimation model shows the rate of change of a transaction having the desired transaction amount from a transaction temporally preceding immediately. This makes the power consumption estimation faster.

The hardware power consumption estimation model further includes a correction factor for correcting the power consumption calculating equation, the correction factor being determined from a to-measurement ratio. This allows an improvement in the precision of the power consumption estimation.

The estimation result is corrected by multiplying an estimated power consumption of a yet-to-be-measured module among modules given the estimation of power consumption, by the ratio between an estimation and a measurement of power consumption of another module measured already. Therefore, the estimation result can be brought yet closer to the power consumption conforming to reality.

Another method of designing an integrated circuit in the present invention comprises: a step (a) of designing architecture for establishing hardware-based functional modules and connections of the functional modules; a step (b) of performing a transaction analysis on the functional modules and the connections; a step (c) of floorplanning the configuration of hardware obtained from the transaction analysis; and a step (d) of repeating the steps (a) to (c) to determine an optimum solution to hardware configuration.

This method allows efficient allocation of hardware resources and floorplanning.

In the step (c), the floorplanning involves information of relative positions of the functional modules. Therefore, a yet appropriate floorplan can be obtained.

Another method of designing an integrated circuit comprises: a step (a) of performing a transaction analysis on hardware-based functional modules in architecture of an integrated circuit and on connections of the functional modules; a step (b) of calculating the areas of the functional modules and areas necessary for the connections, based on the result of the transaction analysis; a step (c) of performing floorplanning based on the areas of the functional modules and the areas necessary for the connections; a step (d) of optimizing a circuit generated by the floorplanning toward smaller areas; and a step (e) of repeating the steps (a) to (d) before determining an optimum solution to hardware configuration and area.

This method allows efficient allocation of hardware resources and consideration of areas.

The calculation of the areas necessary for the connections at the step (b) includes a process of determining appropriate bit sizes based on the result of the transaction analysis on the connections between the functional modules, and then determining layout wiring widths and layout interval sizes for use in layout design, corresponding to the bit sizes. This facilitates the calculation of the areas necessary for the connections.

Another method of designing an integrated circuit comprises: a step (a) of performing a transaction analysis on hardware-based functional modules in architecture of an integrated circuit and on connections of the functional modules; a step (b) of calculating the areas of the functional modules and areas for the connections, based on the result of the transaction analysis; a step (c) of calculating the power consumption of each of the functional modules; a step (d) of calculating a wiring capacitance from the areas for the connections and a per-unit-area capacitance of wiring for the connections, and calculating the power consumption of the connections between modules from this wiring capacitance and the numbers of transactions on the connections; a step (e) of calculating the power consumption of the entire integrated circuit based on the calculations in the steps (c) and (d); and a step (f) of repeating the steps (a) to (e) before determining an optimum solution to hardware configuration, area, and power consumption.

According to this method, it becomes possible to calculate power consumption quickly and precisely with an eye to the point that transactions well reflect power consumption.

The step (e) is followed by: a step (g) of deciding whether or not the power consumption calculated in the step (e) is equal to or lower than a desired value of power consumption; and a step (h) of deciding, in the case where the power consumption calculated is higher than the desired value of power consumption in the step (g), whether or not functional module parallelization for power reduction is possible. Here, if the decision in the step (h) shows that the functional module parallelization is possible, the functional module parallelization is performed, and if not, no operation is made before a return to the step (a). Accordingly, the areas and power consumption are optimized in a short period.

The step (f) is followed by a step of designing power supply wiring before determining an optimum solution to hardware configuration, area, and power consumption. This allows the calculation of areas including the power supply wiring.

The step (e) includes: a substep (e1) of estimating a design structure of a lower level based on design data of an upper level and a design constraint; a substep (e2) of performing a function simulation on design data of the lower level; and a substep (e3) of estimating power consumption from operating information extracted by the function simulation and the design structure of the lower level. Therefore, more accurate power consumption information can be obtained.

Preferably, a step of determining elements for constituting a design data structure of the lower level and wiring widths for the connections from the operating information comes between the substep (e1) and the substep (e3); in the substep (e3), the power consumption is estimated with the elements for constituting the design data structure of the lower level and the wiring width for connection also taken into account.

Another method of designing an integrated circuit comprises: a step (a) of performing a function simulation on design data of an upper level; a step (b) of estimating a design structure of a lower level based on the design data of the upper level, operating information extracted by the function simulation, and a design constraint; and a step (c) of estimating power consumption from the operating information and the design structure of the lower level.

According to this method, the design data of the upper level and the operating information can be used to perform a precise power consumption estimation.

The upper level is a control data flow graph, and the lower level is a register-transfer logic (RTL) level. This improves the precision of the power consumption estimation.

Preferably, a step (k) of determining elements for constituting a design data structure of the lower level and wiring widths for connections from the operating information comes after the step (a) and before the step (c); in the step (c), the power consumption is estimated with the elements for constituting the design data structure of the lower level and the wiring width for connection also taken into account.

In the step (k), the number of register, the number of arithmetic units, the number of selectors, and the number of wires may be determined as the elements for constituting the design data structure of the lower level.

BRIEF DESCRIPTION OF THE DRAWINGS

FIGS. 4A and 4B are diagrams showing transaction amounts on wires in performing a certain job;

FIG. 10 is a chart showing the areas obtained through area estimations using the area estimation model;

FIG. 11 is a diagram showing the constitution of a connection area estimation model to be used for connection area estimation;

FIGS. 15A, 15B, and 15C are diagrams showing a program, a control data flow graph generated therefrom, and a circuit materializing the same, respectively;

FIGS. 16A, 16B, and 16C are diagrams showing a program resulting from dyadic operation expansion processing on a program, a control data flow graph generated therefrom, and a circuit materializing the same, respectively;

FIG. 19 is a chart showing an example of design data on the number of toggles of each element in FIG. 16C, obtained through a function simulation; and FIG. 20 is a chart showing an example of technology data that stores in a table the size (bits) and per-toggle energy consumption of each element in FIG. 16C.

DETAILED DESCRIPTION OF THE PREFERRED EMBODIMENTS (Basic Design Procedure of the Invention)

Figure 1:
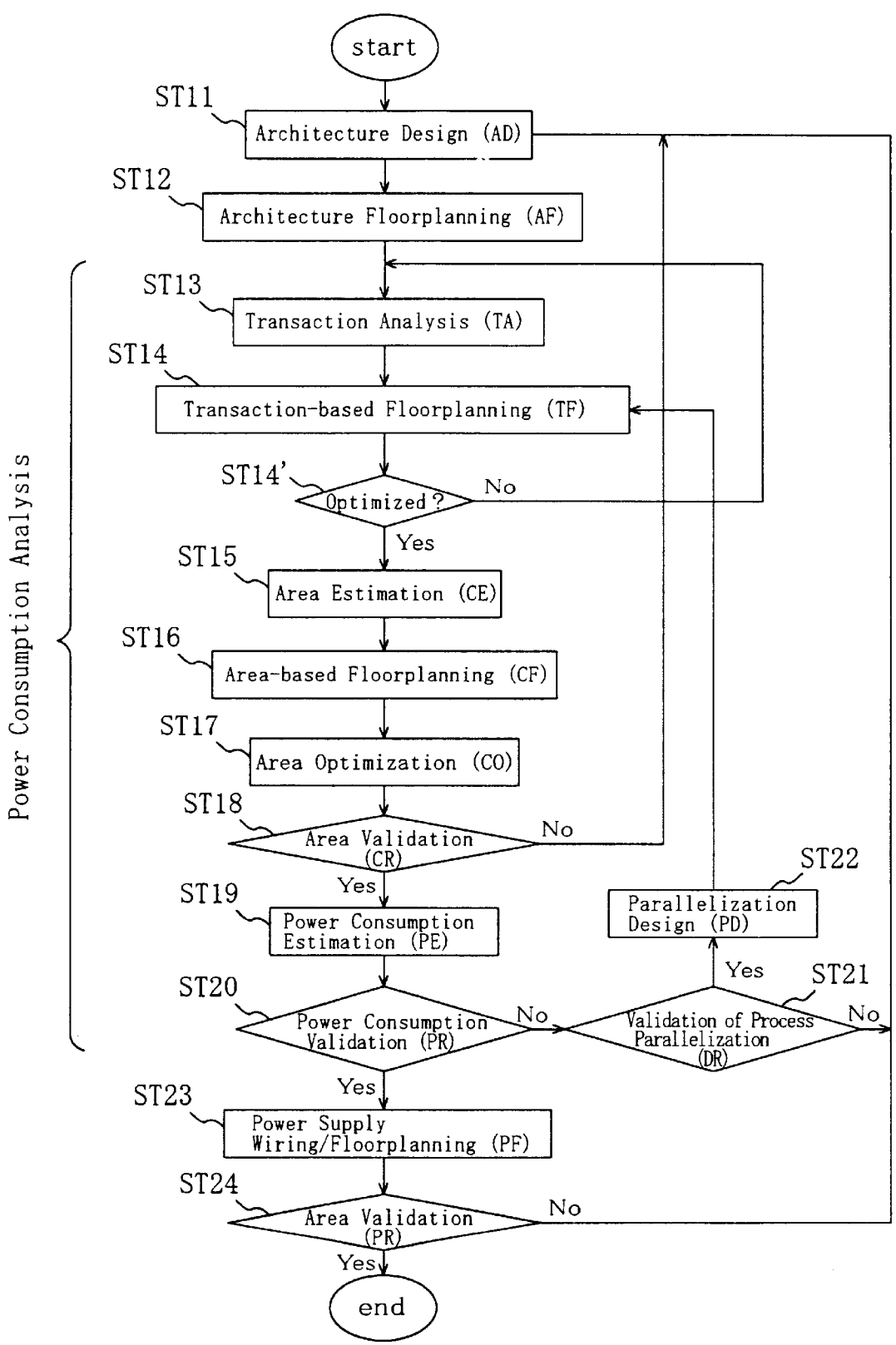
FIG. 1 is a flowchart showing the basic design procedure according to the present invention, for designing an integrated circuit of low power consumption type on the upstream side of design through the use of transactions.

Initially, description will be given of the basic design procedure of the present invention. FIG. 1 is a flowchart showing the basic design procedure according to the present invention, for designing an integrated circuit of low power consumption type on the upstream side of design through the use of transactions. As the essential processing in each of the steps will be detailed later, schematic description will be first given of the flow of design.

Architecture design (AD) and architecture floorplanning (AF) are performed at step ST11 and step ST12, respectively, to present functional parts and connections in a 2D image. Next, at step ST13, a transaction analysis (TA) is performed in the steps to be described later. Next, at step ST14, transaction-based floorplanning (TF) is performed to examine the configuration of the functional parts and connections on the basis of the transaction analysis. Specifically, the wiring widths of buses connecting the functional parts, the memory size, and the configuration of the functional parts are subjected to examination. Then, at step ST141, a determination is made as to whether or not the bus wiring widths, the memory size, and the hardware configuration of the functional parts and the like are optimized. The processing of step ST13 and step ST14 is repeated until an optimum configuration is obtained.

Next, at step ST15, area estimation (CE) is performed on the areas of the functional parts and the areas (hereinafter, referred to simply as "connection areas") of members (chiefly the bus wiring) that are necessary to establish connections between the functional parts. Here, the area of the entire circuit is estimated from a functional part area estimating model and a connection area estimating model.

Then, at step ST16, area-based floorplanning (CF) is performed. At step ST17, area optimization (CO) is performed. Then, at step ST18, this floorplan is subjected to validation as to whether or not the area of the circuit satisfies area specifications (CR). If the area specifications are not satisfied, return to step ST11 to repeat the processing from the examination of architecture design (AD) to the optimization of area (CO) at step ST17. If the determination at step ST18 shows that the area specifications are satisfied, proceed to the next step ST19.

At step ST19, power consumption estimation (PE) is performed. Here, as will be described later, the power consumption of the integrated circuit to be designed is estimated from the functional parts areas, the connection areas, and the transaction analysis. Then, at step ST20, whether power consumption specifications are satisfied or not is checked (PR). If the determination at step ST20 shows that the power consumption specifications are satisfied, then proceed to the next step ST23. On the other hand, if the power consumption specifications are not satisfied, move to step ST21 to determine whether or not to parallelize the functional parts. If the functional parts are to be parallelized, perform at step ST22 the parallelization processing of shifting timing for split processes. Then, return to step ST14 to go back to the transaction-based floorplanning. On the other hand, if it is determined at step ST21 not to take the functional parts parallelization approach, return to step ST11 to start with the architecture design again.

Incidentally, the transaction analysis does not necessarily require the above-described step ST12. The reason is that the transaction analysis can be made as long as some architectural structure is present.

When the above-described processing is repeated until the determination at step ST20 shows the satisfaction of the power consumption specifications, proceed to step ST23. At step ST23, power supply wiring floorplanning is performed. At this step ST23, power supply wires of appropriate sizes are inserted into appropriate locations based on the power consumption estimation of step ST19. This processing cause an increase in area by the amount corresponding to the inserted power supply wires. Therefore, at step ST24 that follows, perform the validation of the circuit area (PR) again and, if the circuit area satisfies the area specifications, end this processing. On the other hand, if the area specifications are not validated, return to step ST11 to go back to the architecture design (AD).

Needless to say, the step ST11 for architecture design need not be performed when architecture of known structure is used. The present invention is applicable to even such a case.

Moreover, the estimation of power consumption does not necessarily require the area-based floorplanning at step ST16. The reason is that the power consumption can be estimated if the areas are known.

Next, description will be given in details of the processing in each of the steps described above.

(Architecture Design)

Here, the architecture design (AD) at step ST11 may employ C-based or other design techniques conventionally put in general-purpose uses.

(Architecture Floorplanning)

Figure 2A:
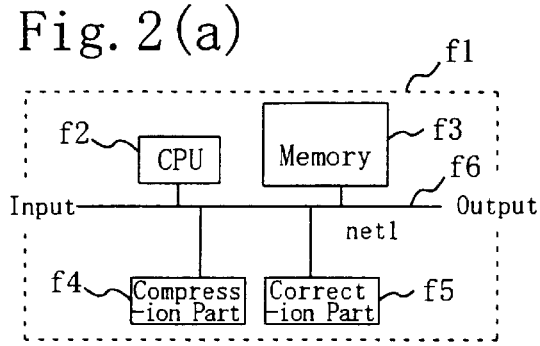
FIGS. 2A to 2F are diagrams showing the floorplans in the respective designing steps.

FIG. 2A is a block circuit diagram showing an example of circuit configuration designed by the architecture floorplanning (AF) at step ST12. Assume here that an integrated circuit f1 to be constituted comprises a CPU f2, a memory f3, a compression part f4, a correction part f5, and a wiring net1 part f6 for establishing connections among the CPU f2, the memory f3, the compression part f4, and the correction part f5.

(Transaction Analysis)

Figure 3:
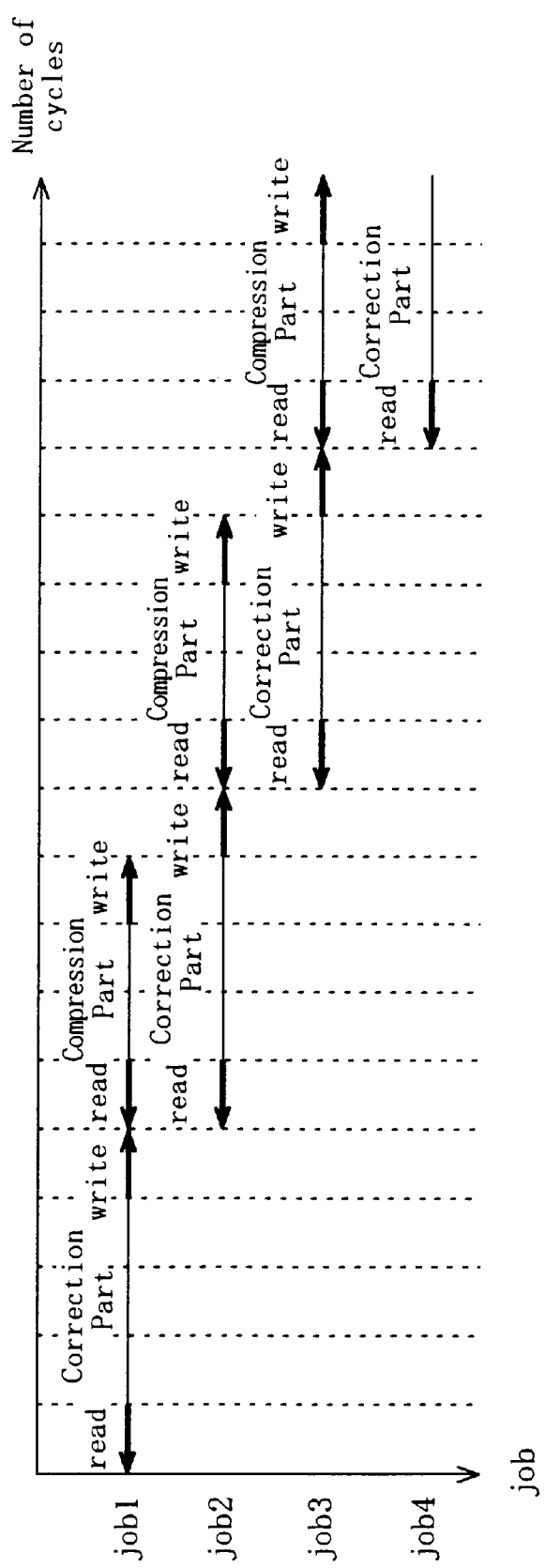
FIG. 3 is a timing chart showing the operation timing of each part of the integrated circuit used in the transaction analysis.

FIG. 3 is a timing chart showing the operation timing of each part of the integrated circuit f1 to be used in the transaction analysis (TA) at step ST13. Here, with reference to this timing chart, description will be given of the amount of data moving (flowing) through the wiring net1 part f6. The timing chart of FIG. 3 shows that the time at which the compression part f4 reads data from the memory f3 upon job1 overlaps with the time at which the correction part f5 reads data from the memory f3 on job2 that follows. This also holds true between job 2 and job 3, and between job 3 and job 4.

FIG. 4A is a diagram showing the transaction amount occurring in the wiring net1 part f5 upon the execution of the jobs shown in the timing chart of FIG. 3. Since the wiring net1 part f6 establishes connections among the memory f3, the compression part f4, and the correction part f5, it must be configured so as to be capable of dealing a large amount of data at the time of the overlapping data reads by the compression part f4 and the correction part f5 shown in FIG. 3. Thus, it is apparent that 64 bits of data cannot be simultaneously dealt with by the wiring net1 part f6 alone.

In the transaction analysis, it is possible to analyze how resources are occupied by such move (flow) of data (transactions). While in the above example the resource subjected to the transaction analysis is a bus, the analysis may also be applied to any of the resources including the CPU f2, the memory f3, the compression part f4, and the correction part f5.

(Transaction Analyzing Model)

Figure 5:
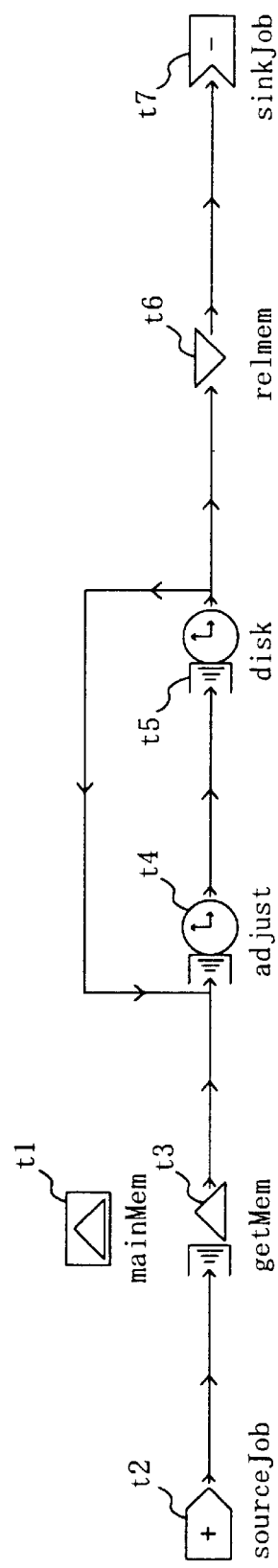
FIG. 5 is a diagram for explaining a transaction analyzing model prevailing heretofore.

FIG. 5 is a diagram for explaining a conventionally-prevalent transaction analyzing model. Initially, description will be given of the elements of the transaction analyzing model shown in FIG. 5.

The mainMem t1 represents a resource model to be dealt with by the transaction analysis. The sourceJob operation t2 determines the interval of occurrence and the amount of occurrence to develop transactions. The getMem operation t3 reserves a resource on the resource model mainMem t1. The adjust operation t4 sets the time required for correction processing. The disk operation t5 sets the time to write on disk. The relmem operation t6 releases the reserved resource. The sinkjob operation t7 terminates the processing. In this way, the use of the conventional transaction analyzing model makes it possible to analyze the state of occupation of a target resource by handling the interval of occurrence and the amount of occurrence of transactions and the processing times.

Now, taking the compression part f4 as an example, explanation will be given of the characteristic elements of the transaction analyzing model in the present invention. Transactions associated with compression or expansion vary depending on the properties (or types) of data to be processed. In contract, models indicating processing time alone, such as the adjust operation t4 by the correction part f5 in the conventional transaction analyzing model shown in FIG. 5, cannot provide any transaction analyzing model in where change depending on the properties of data to be processed (hereinafter, referred to as "a data-dependent transaction analysis model").

Figures 6, 7:
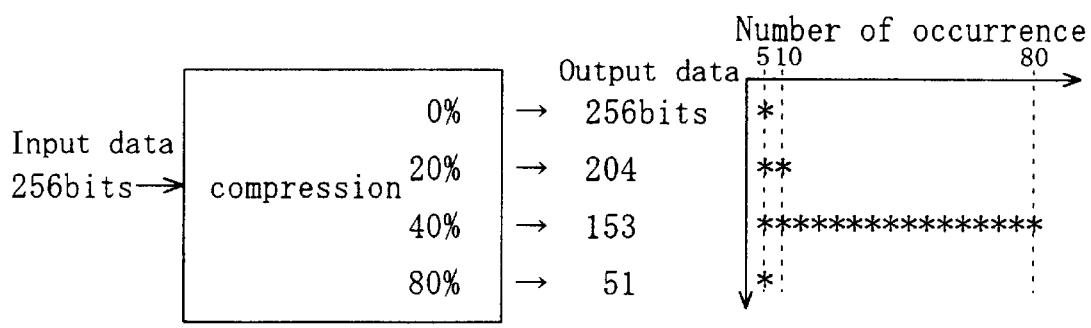
FIG. 6 is a chart showing a transaction analyzing model for a compression part.
FIG. 7 is a diagram summarizing the numbers of bits and the frequencies of occurrence of output data when 256 bits of data is input to the transaction analyzing model of the compression part.

Construction of a data-dependent transaction analyzing model requires the rate of change of transaction and the probability of occurrence of the change. FIG. 6 is a chart showing a transaction analyzing model for the compression part f4. In the chart, the rate of change of transaction is shown as data compression rate. The probability of occurrence of the change is the frequency (ratio) of occurrence. The frequency of occurrence of data output by the compression part within the transaction analyzing time is taken here to be 100%. Then, assume that data having a data compression rate of 0%, or not compressed at all, is output at a frequency (ratio) of 5%. Then, data with a compression rate of 20% is to be output at a frequency (ratio) of 10%, data with a compression rate of 40% at a frequency (ratio) of 80%, and data with a compression rate of 80% at a frequency (ratio) of 5%. This frequency information is obtained from the characteristics of the circuit to be determined.

FIG. 7 is a diagram summarizing the numbers of bits and the frequencies of occurrence of output data when 256 bits of data is input to the transaction analyzing model shown in FIG. 6. Given an input of 256 bits, the compression rates of 0%, 20%, 40%, and 80% provide output data of 256 bits, 204 bits, 153 bits, and 51 bits, respectively. The frequencies of occurrence of the respective output data are 5%, 10%, 80%, and 5%, as defined in FIG. 6. Thus, the data that is output the most frequently is of 153 bits. Note that 256 bits of data is output at a probability of 5%. That is, as long as the main processing is handled alone, the scale adaptable to output data of up to 153 bits is sufficient. Constitutional examination is necessary, however, so as to be capable of handing 256 bits of output data which occurs at the frequency of 5%.

In this way, the use of the data-dependent transaction analysis model in the present embodiment allows a grasp of the frequencies and data amounts, thereby making it possible to design an optimum configuration for maximizing resources.

(Normal Distribution Model for Transaction Analysis)

Now, if the rates of change of transactions and the probabilities of occurrence of the changes cannot be defined as clearly as in the transaction analyzing model for the compression part f4 described above, normal distribution models may be used. The normal distribution is a distribution used the most generally in handling numbers of data. The distribution curve is symmetric about the mean value. Therefore, when any two values out of the mean value, the upper limit, and the lower limit are determined, the entire distribution curve is determined uniquely.

Figures 8A, 8B:
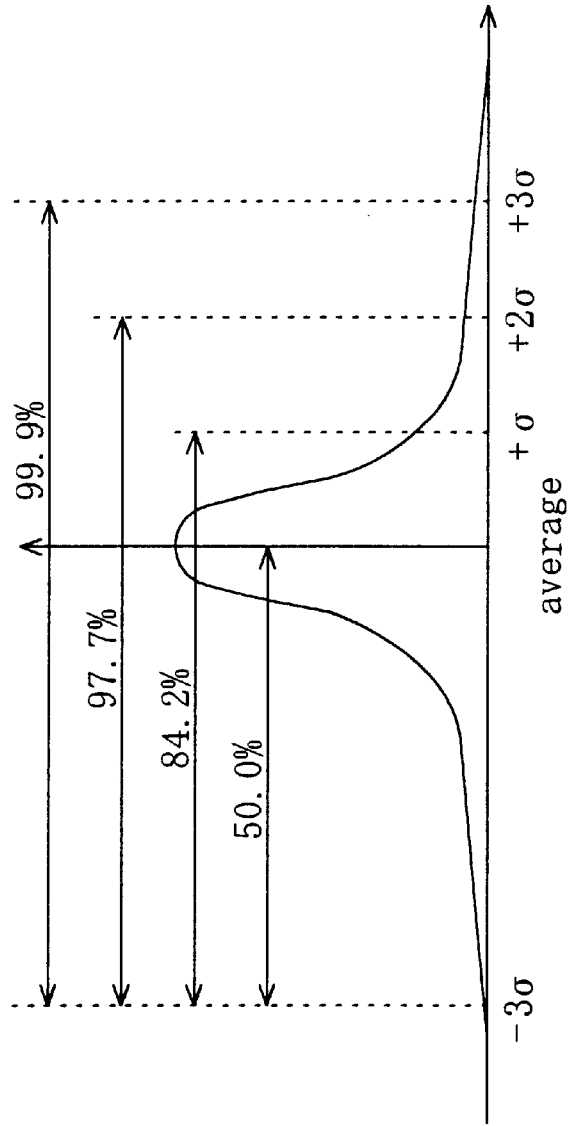
FIGS. 8A and 8B are charts showing a normal distribution model for the compression part and the transaction analyzing part in the case of using this normal distribution model, respectively.

FIGS. 8A and 8B are charts showing a normal distribution model for the compression part f4 and the transaction analyzing model for the case of using this normal distribution model, respectively. As shown in FIG. 8A, the normal distribution model is defined so that the cumulative frequency of occurrence (probability) up to average is 50%, the cumulative frequency of occurrence (probability) up to average+σ is 84.2%, the cumulative frequency of occurrence (probability) up to average+2σ is 97.7%, and the cumulative frequency of occurrence (probability) to average+3σ is 99.9%, wherein average is the mean value and σ is the standard deviation. Given that the upper limit of compression rate is 80% and the lower is 0%, the mean value can be obtained therefrom as (80+0)/2 =40. Moreover, if the upper limit of compression rate of 80% and the mean value of 40% are given exclusively, the lower limit can be obtained as 40−(80−40)=0. Similarly, the upper limit of compression rate can be determined when the lower limit of compression rate and the mean value are given. As shown in FIG. 8B, the normal distribution model can be used to determine the compression rates and the cumulative frequencies of occurrence of 256-bit input data. Here, the upper limit corresponds to average+3σ, and the lower limit to average−3σ. Then, σ={(average+3σ)−average}/3 gives σ=13.3, which determines average+σ and average+2σ.

(Transaction Analyzing Model)

Moreover, high speed, high precision analyses can be realized by defining the data-dependent transaction analyzing model as shown in FIG. 6 from the results of actual applications.

(Transaction Base Floorplanning)

Next, description will be given of the processing content of the transaction based floorplanning (TF) at step ST14.

From the analysis of the wiring net1 part f6 shown in FIG. 4A, it is found that the architecture floorplan (AF) of FIG. 2A obtained in the step ST12 requires a wiring width for handling a transaction amount of 64 bits at the time when the memory accesses by the compression part f4 and the correction part f5 overlap each other.

Figure 2B:
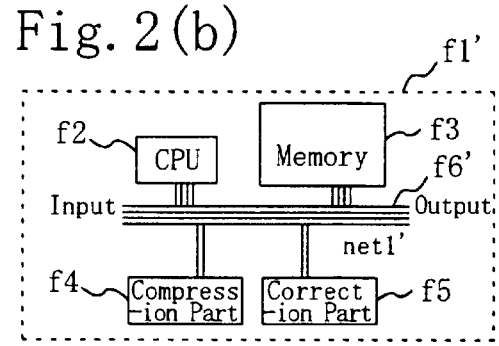

In view of this, the configuration of an integrated circuit f' for achieving this processing is displayed as shown in FIG. 2B, at the transaction based floorplanning (TF) at step ST14. This configuration is characterized in that a wiring net1' part f6' including the information of the wiring width is arranged in place of the wiring net1 part f6 in FIG. 2A. Then, the paths from the compression part f4 and the correction part f5 to the backbone of the wiring net1' part f6 are laid in a wiring width for handling a transaction amount of 32 bits. Nevertheless, it is inefficient to design even the backbone part of wiring greater for the sake of transactions most of which occur only in certain limited periods.

Figure 2C:
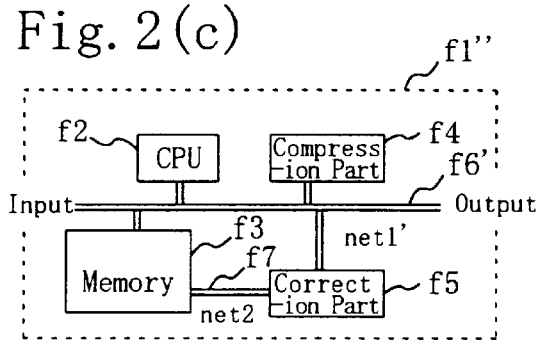

Therefore, if the determination at step ST14' shown in FIG. 1 indicates of no optimization, an integrated circuit f1'' as shown in FIG. 2C is displayed and newly subjected to the transaction analysis (TA) at step ST13. This integrated circuit f1″ has a wiring net2 part f4 for establishing connection between the correction part f5 and the memory f3, aside from the wiring net1′ part f6′ which establishes connection among the CPU f2, the memory f3, the compression part f4, and the correction part f5. FIG. 4B is a diagram showing the result of the transaction analysis performed on the integrated circuit f1″ shown in FIG. 2C. As shown in FIG. 4B, there seems to be no problem since the processing is performed through both the wiring net1′ part f6′ and the wiring net2 part f7. Then, this analysis is reflected to the transaction based floorplanning at step ST14, so that the configuration of the integrated circuit f1″ shown in FIG. 2C is adopted to determine the wiring widths of the wiring net1′ part f6′ and the wiring net2 part f7.

Figure 2D:
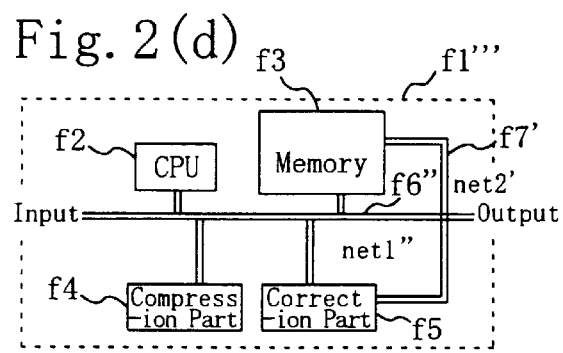

In that case, connecting the memory f3 and the correction part f5 without consideration of the length of the wiring net2 part f7 can possibly result in a configuration such as an integrated circuit f1‴ shown in FIG. 2D. Therefore, wiring is preferably designed to rough wiring length information obtained from the area of the CPU f2 which is known information, the area of the memory f3 which can be estimated by the transaction analysis, and the arrangements thereof.

(Area Estimation)

The area estimation (CE) at step ST15 is performed by using a function area estimation model Cm1 and a connection area estimation model Cn1 to be described below.

Function Area Estimation Model

Figure 9:
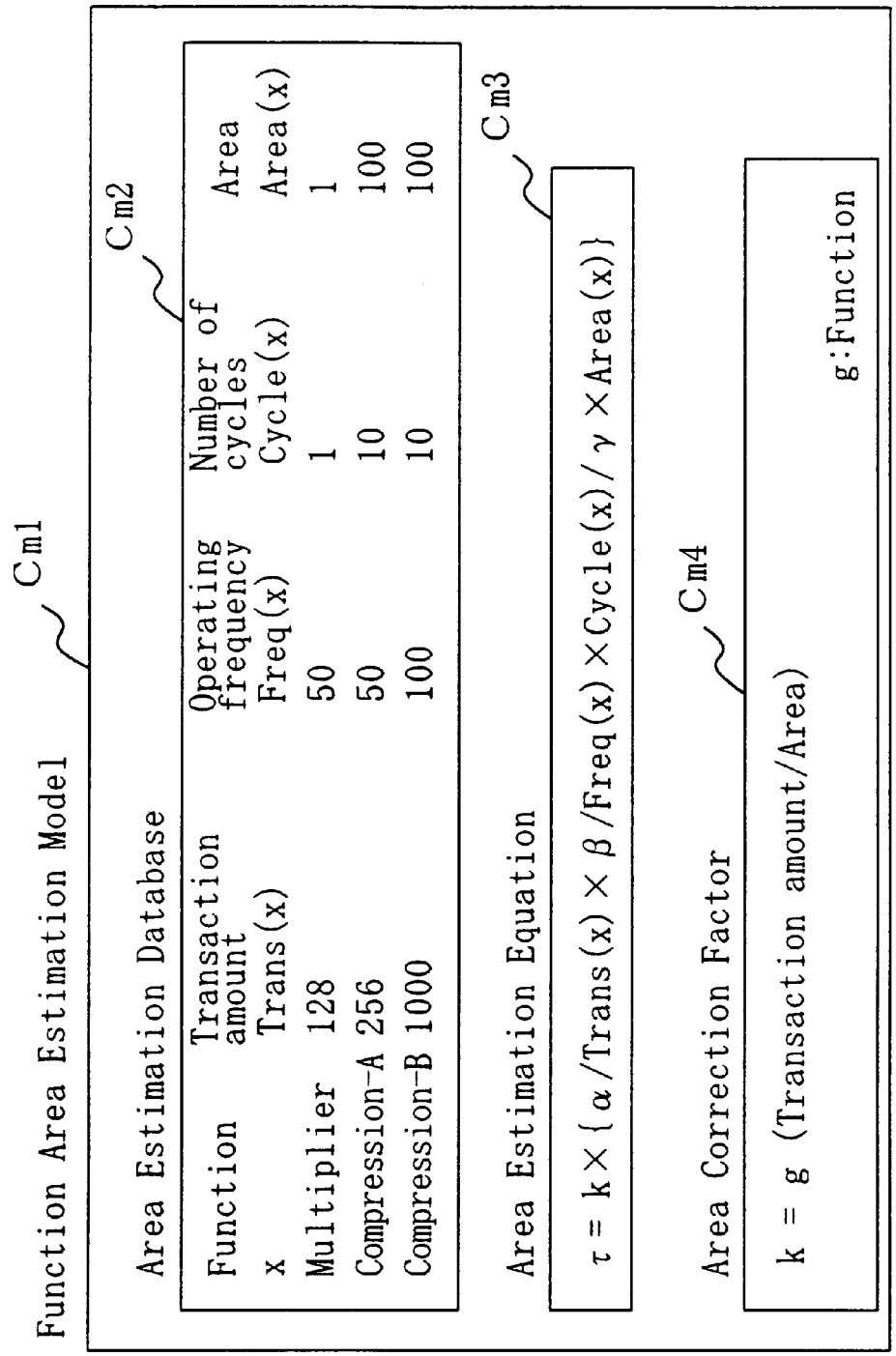
FIG. 9 is a diagram showing the constitution of a function area estimation model.

FIG. 9 is a diagram showing the constitution of a function area estimation model Cm1. As shown in the diagram, the function area estimation model Cm1 comprises an area estimation database Cm2, an area estimation equation Cm3, and an area correction factor Cm4. In the area estimation database Cm2 are registered a transaction amount Trans(x), an operating frequency Freq(x), the number of cycles Cycle (x), and an area Area(x) for each known function x. With respect to a circuit for area calculation, a reference is made to the area Area(x) that corresponds to the function x, the transaction amount Trans(x), the operating frequency Freq (x), and the number of cycles Cycle(x) registered in this area estimation database Cm2. For example, in the case of compression-A, Area(compression-A)=100 if Trans (compression-A)=256, Freq(compression-A)=50, and Cycle (compression-A)=10. It is impossible, however, to obtain the area of the A-scheme compression function from this area estimation database Cm2 alone when Trans(compression-A)=128.

Then, the area estimation equation Cm3 for interpolating the area estimation database Cm2 is defined. In the area estimation equation Cm3, a target area $\tau$ is determined from a transaction amount $\alpha$, an operating frequency $\beta$, and the number of cycles $\gamma$, which are not in the area estimation database Cm2, as well as the transaction amount Trans(x), the operating frequency Freq(x), and the number of cycles Cycle(x), which the area estimation database Cm2 is based on. In addition, k(x) is a correction factor, given by the area correction factor Cm4.

As described above, the area estimation database Cm2, area estimation equation Cm3, and area correction factor Cm4 are provided to constitute the area estimation model Cm1 in advance.

FIG. 10 is a chart showing the areas obtained through area estimations using the area estimation model Cm1. A transaction amount of 128, an operating frequency of 50, and the number of cycles of 1 give $(128/128) \times (50/50) \times (1/1) = 1$. Then, a transaction amount of 256, an operating frequency of 100, and the number of cycles of 2 give $(256/128) \times (100/50) \times (1/2) = 2$.

When the area determined in a lower step and the area estimated by the area estimation model Cm1 thus differ each other, the area correction factor Cm4 can be used to make a correction. This correction factor is obtained from the ratio of the transaction amount to the area calculated.

Connection Area Estimation

FIG. 11 is a diagram showing the constitution of a connection area estimation model Cn1 to be used for connection area estimation. As shown in the diagram, the connection area estimation model Cn1 comprises a connection area estimation database Cn2 and a connection area estimation equation Cn3. In the connection area estimation database Cn2 are registered a layout wiring width ww(y) and a wiring pitch wp(y) for each process y. A connection bit size BitSize obtained by the transaction based floorplanning (TF) at step ST14 is multiplied by the summation ww(y)+wp(y) to estimate a wiring width. This wiring width {BitSize×(ww (y)+wp(y))} is further multiplied by a wiring length Wire-Length to estimate a connection area $\epsilon$.

(Area Based Floorplanning)

Figure 2E:
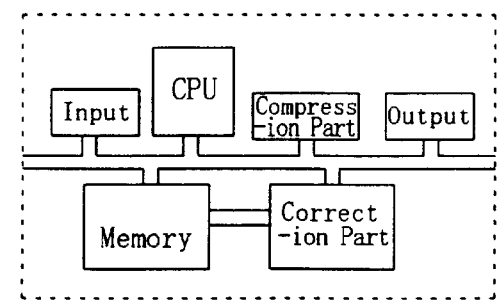
Figure 2F:
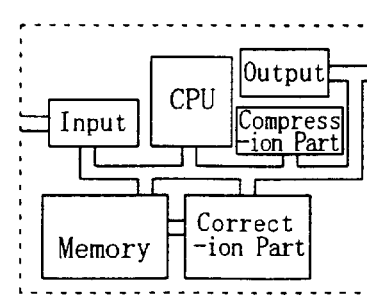

Next, description will be given of the processing at the area based floorplanning (CF) of step ST16. In the processing of this step, the functional module areas and connection area obtained by the area estimation (CE) at step ST15 are reflected to floorplanning. FIG. 2E is a diagram showing the layout designed in the process of the area based floorplanning (CF) at step ST16. Besides, FIG. 2F is a diagram showing the layout that results from the process of the area optimization (CO) at step ST17. Then, at step ST18, whether or not the layout areas shown in FIG. 2F satisfy the area specifications is checked.

(Power Consumption Estimation)

Next, description will be given of a power consumption estimation model for used in the power consumption estimation at step ST19.

Power Consumption Estimation Model

Figure 12:
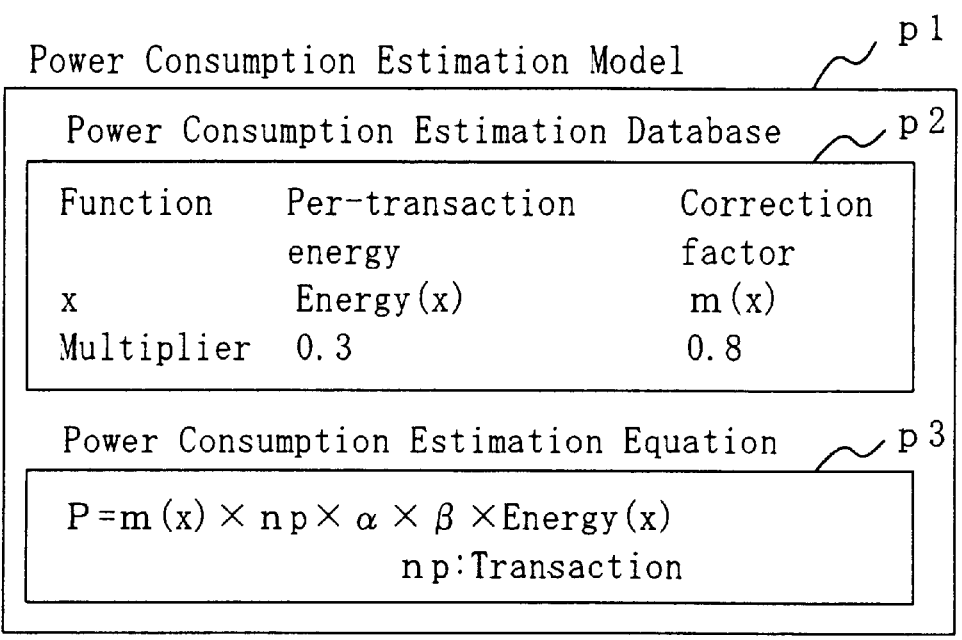
FIG. 12 is a chart showing the configuration of a power consumption estimation model for estimating the power consumption of the individual functions from the results of the transaction analysis.

FIG. 12 is a chart showing the configuration of a power consumption estimation model p1 for estimating the power consumption of the individual functions from the results of the transaction analysis. As shown in the chart, the power consumption estimation model p1 comprises a power consumption database p2 and a power consumption estimation equation p3. In the power consumption estimation database p2 are registered energy Energy(x) and a correction factor m(x) for each function x. The correction factor m(x) is determined from power consumption measured already. It is set to 1 in the cases of no measurement. In the power consumption estimation equation p3, target power consumption P is determined as the product of the following: the per-transaction energy Energy(x) and the correction factor m(x) registered in the power consumption estimation database p2; a desired transaction amount $\alpha$; a desired operating frequency $\beta$; and a transaction inversion rate np. The transaction inversion rate np represents the rate of change of the present transaction from a temporally immediately preceding transaction.

Now, description will be given of an example where power consumption estimation is performed on the multiplier registered in the power consumption estimation model p1 as shown in FIG. 12. Assume here that a transaction amount of 32 is processed at an operating frequency of 50. Meanwhile, it is known from the power consumption estimation database p2 that the per-transaction energy is 0.3 and the correction factor is 0.8. The transaction inversion rate np represents a change from a temporally immediately preceding transaction. Given that the transaction amount is 32, a change of 3 gives np (n→n+1)=0.09. If a change of 10 follows, np (n+1→n+2)=0.31. The average thereof falls on np=0.20. Accordingly, in this example, desired power consumption P is obtained as follows:

$$P=0.8\times0.2\times32\times50\times0.3=76.8.$$

Subsequently, at the power consumption validating step of step ST20, the power consumption determined in step ST19 is validated.

Then, from the result of the validation at step ST20, it is checked whether or not to take the parallelization approach for lower power consumption. At step ST21, the parallelization design (PD) is performed. If the parallelization is performed, transactions are split. Therefore, no transaction analysis is performed again, and the transactions are distributed to parallelized functional parts.

(Power Supply Wiring/Floorplanning)

At step ST23, the result of the power consumption analysis at step ST20 is reflected to floorplanning. Here, power supply wiring is designed with consideration given to the number of power supply wires and the areas of the power supply wires on high power consumption parts.

(Model Improvement)

Figure 13:
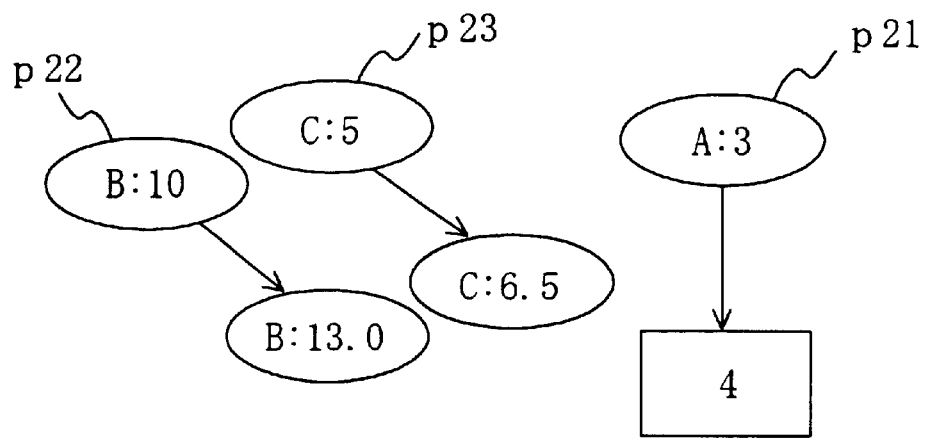
FIG. 13 is a diagram for explaining the method of improving the areas and power consumption obtained by area estimation processing and power consumption estimation processing.

FIG. 13 is a diagram for explaining the method of improving the areas and power consumption obtained in the area estimation processing of step ST15 and in the power consumption estimation processing of step ST19. In the diagram, the power consumption p21 of a function A, the power consumption p22 of a function B, the power consumption p23 of a function C have estimations of 3, 10, and 5 (each in arbitrary units), respectively. If the function A is initially designed, materialized, and analyzed with a result of 4, then the correction factor is 1.3. Then, if the functions B and C are yet to be materialized, the correction factor of 1.3 is applied to the estimations of the functions B and C to correct the estimated values. As a result, the function B is 6.5 (arbitrary units) in power consumption, and the function C is 13 (arbitrary units). This allows the correction of the estimations without designing the functions B and C in the concrete.

(Second Embodiment)

Now, in a second embodiment, description will be given of a method for generating the power consumption estimation model of the first embodiment described above. The present embodiment will deal with the method of generating the power consumption estimation model to be used at step ST19 in FIG. 1 cited above, for situations where design data of upper levels, or hardware functions, is prepared.

Figure 14:
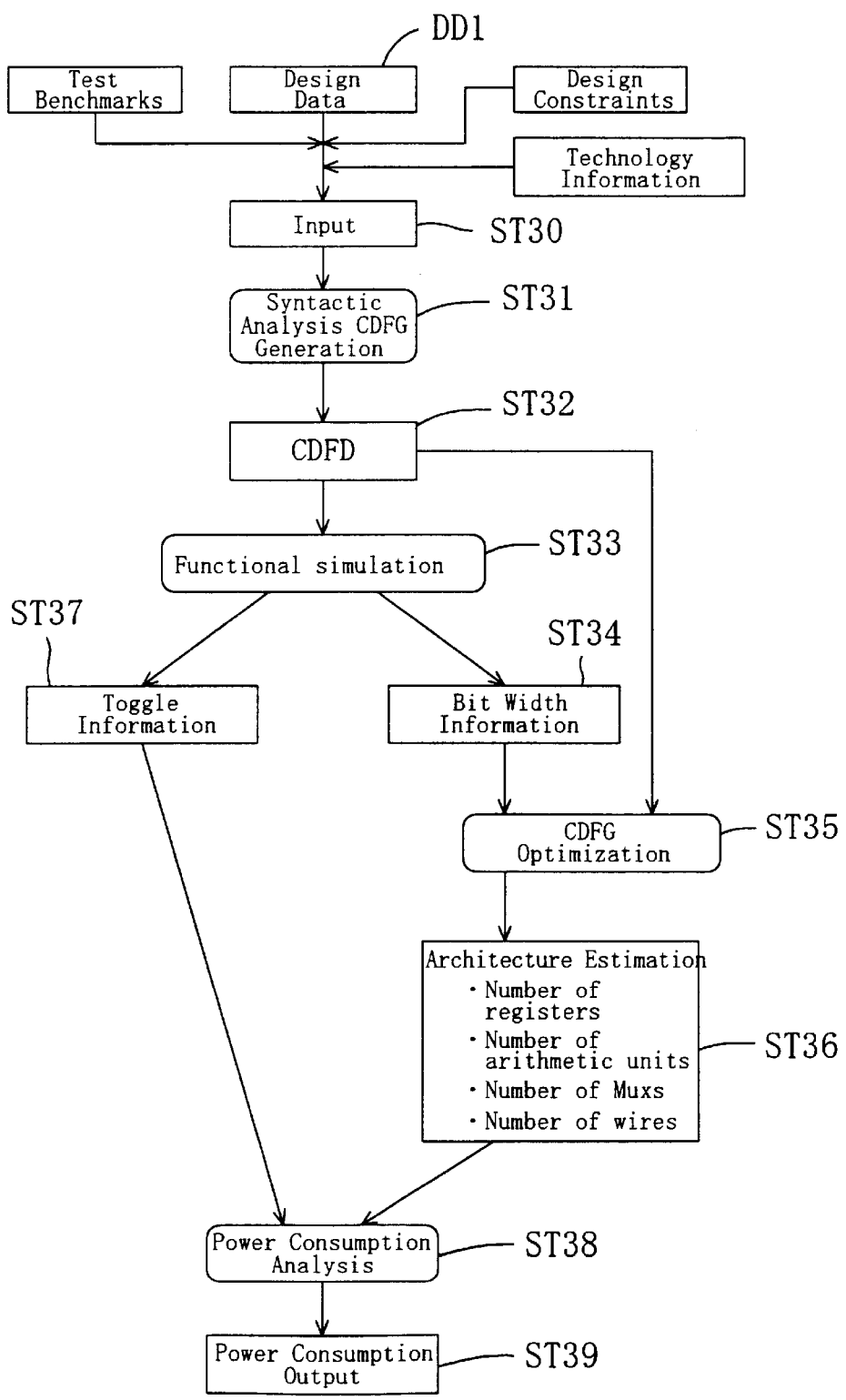
FIG. 14 is a flowchart showing the flow of creating a power consumption estimation model in a second embodiment.

FIG. 14 is a flowchart showing the flow of creating a power consumption estimation model in the present embodiment.

At step ST30, design data DD1 prepared in advance, test benchmarks for function simulations, design limitations, and technology data are input. At step ST31, the design data DD1 is subjected to syntactic analysis to generate a control data flow graph (CDFG).

FIGS. 15A, 15B, and 15C are diagrams respectively showing a program which is an example of the design data DD1, a control data flow graph generated therefrom, and a circuit materializing the same. Initially, the program of FIG. 15A is subjected to syntactic analysis to generate the control data flow graph (CDFG-1) shown in FIG. 15B. This processing is simple. As shown in FIG. 15B, the control data flow graph (CDFG-1) consists of cond10, cond20, cond30, and cond40. FIG. 15C is a block circuit diagram showing the structure that realizes CDFG-1 in hardware. As shown in the diagram, the hardware for executing the program shown in FIG. 15A comprises elements p30 to p34. The element p30 performs an exclusive-OR operation. The element p31 adds input data in0 and in1 input through nets n31 and n32, respectively. The element p32 adds input data in2 and in3 input through nets n33 and n34, respectively. The element p33 adds the addition of input data in4 input through a net n36 and the output of the element p32 input through a net n35. The element p34 (multiplexer) selects any one of the outputs of the elements p30, p31, and p33 for output.

Next, at step ST32 in the flowchart shown in FIG. 14, the control data flow graph CDFG-1 shown in FIG. 15B is subjected to dyadic operation expansion processing to insert a variable "t (=in0+in1)" to between arithmetic units. FIGS. 16A, 16B, and 16C are diagrams respectively showing a program resulting from the dyadic operation expansion processing on the above-described program, a control data flow graph generated therefrom, and a circuit materializing the same. Here, the control data flow graph CDFG-2 shown in FIG. 16B is obtained by applying the dyadic operation expansion processing to the control data flow graph CDFG-1 shown in FIG. 15B. As shown in FIG. 16B, the dyadic operation expansion processing converts cond30 on the control data flow graph CDFG-1 into cond31 on the control data flow graph CDFG-2. As shown in FIG. 16C, in terms of hardware, an element p37 for defining the variable "t" is then added to the configuration shown in FIG. 15C, in the middle of the net n35.

Figures 17, 18:
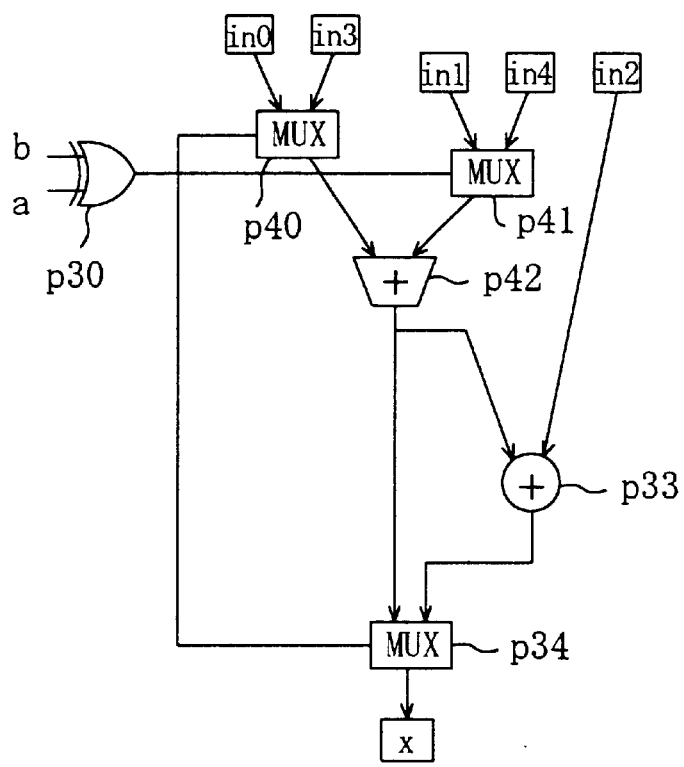
FIG. 17 is a chart showing in a table the maximum operation ranges and components of the nets in FIG. 16C.
FIG. 18 is a diagram showing the configuration for the case of sharing two elements shown in FIG. 16C.

Next, at step ST35, the control data flow graph CDFG-2 is optimized based on the design constraints. At that occasion, if the design constraints are timing-oriented, the variable "t" inserted to the control data flow graph CDFG-2, i.e., the element p37 shown in FIG. 16C is constituted as a register (scheduling). If not a register, the element p37 is realized by wiring. When the design constraints are area-oriented, the elements p31 and p32 are replaced, as shown in FIG. 18, with an adder element p42 that is shared by the two elements p31 and p32, as well as selector elements p40 and p41 therefor.

As described above, at step ST35, scheduling and sharing are repeated in accordance with the design constraints, to optimize the control data flow graph CDFG. At step ST36, architecture estimation is performed to determine the configurations of the individual elements. Specifically, estimations are made as to the number of registers, the number of arithmetic units, the number of MUXs (multiplexers), the number of wires, and so on.

Next, at step ST33 in the flow of FIG. 14, the test benchmarks, the control data flow graph CDFG-2, and the configurations of the individual elements determined by the architecture estimation at step 36 are put into a function simulation to extract toggle information and bit width information of each element constituting the design data. Here, the size of each element in the hardware shown in FIG. 16C is determined from the bit width information extracted. For the bit width information, maximum operation ranges of bus-structured nets are extracted from the toggle information of the respective nets. FIG. 17 is a chart showing in a table the maximum operation ranges and components of the nets in FIG. 16C.

Next, the sizes of the elements to be connected with the nets are determined. The element p31 to be connected with the nets n31 and n32 having a maximum operation range of 8 bits must be an additive element that meets 8-bit input. The element p32 to be connected with the nets n33 and n34 having a maximum operation range of 6 bits needs to be an additive element that meets 6-bit input. Moreover, the element p37 to be connected with the net n35 having a maximum operation range of 7 bits must be an additive element that meets 7-bit input. Then, the element p33 to be connected with the net n36 having a maximum operation range of 8 bits needs to be an additive element that meets 8-bit input. The hardware is determined as described above.

Next, at step ST38, the toggle information extracted at step ST37 is assigned to the individual elements in the architecture estimated at step ST 36, to perform power consumption estimation. At step ST 39, a power consumption is output as the analysis result.

FIG. 19 is a chart showing an example of design data on the numbers of toggles of the individual elements p31–34 in FIG. 16C, obtained from the function simulation at step ST33. FIG. 20 is a chart showing an example of technology data that stores in a table the size (bits) and per-toggle energy consumption of each element in FIG. 16C.

From FIGS. 19 and 20 mentioned above, there is obtained the following equation:

$$P = (10 \times 10 + 20 \times 5 + 10 \times 15 + 10 \times 10)/T = 450/T,$$

where T is analysis time.

Moreover, the energy consumption Energy(x) in the power consumption estimation databasep2 of the power consumption estimation model p1 in FIG. 12 is given by the following equation:

$$\text{Energy}(x) = (10 + 10 + 20 \times 5 + 10 \times 15 + 10 \times 10)/(10 + 20 + 10 + 10) = 9.$$

As has been described, in the present embodiment, design data of upper levels or hardware functions, if prepared, can be used to estimate the lower-level structure based on the design constraints. Then, the structure in turn can be used to perform power consumption estimation for yet precise estimation of power consumption.

What is claimed is:

1. A method of designing an integrated circuit, comprising the step of performing a transaction analysis by using a transaction analyzing model including a database for storing a transaction amount in an integrated circuit to be designed, said transaction amount being expressed as events in a statistical distribution.

2. The method of designing an integrated circuit according to claim 1, wherein
said transaction analyzing model is to select a plurality of transaction amounts and frequencies of occurrence based on said statistical distribution.

3. The method of designing an integrated circuit according to claim 1, wherein
said database of said transaction analyzing model stores a normal distribution as said statistical distribution.

4. The method of designing an integrated circuit according to claim 1, wherein
said transaction analysis is performed by executing an application and extracting said statistical distribution.

5. A method of designing an integrated circuit, comprising the step of optimizing the area of hardware by using a hardware area estimation model including a hardware area estimation database storing a transaction amount, the number of processing cycles, an operating frequency, and an area of each hardware function of an integrated circuit to be designed.

6. The method of designing an integrated circuit according to claim 5, wherein:
said hardware area estimation database stores a basic transaction amount, the basic number of processing cycles, a basic operating frequency, and a basic area of each hardware function; and
said hardware area estimation model further includes an area calculating equation for calculating an area from said basic transaction amount, the basic number of processing cycles, said basic operating frequency, said basic area, a desired transaction amount, the number of processing cycles desired, and a desired operating frequency.

7. The method of designing an integrated circuit according to claim 6, wherein
said hardware area estimation model further includes a correction factor for correcting said area calculating equation, said correction factor being determined from said desired transaction amount and said area calculated.

8. A method of designing an integrated circuit, comprising the step of performing a power consumption analysis by using a hardware power consumption estimation model including:
a power consumption estimation database for storing per-transaction energy and a correction factor of each hardware function of an integrated circuit to be designed; and
a power consumption calculating equation for calculating power consumption from said energy and correction factor in said power consumption estimation database, a desired transaction amount, a desired operating frequency, and a transaction inversion rate.

9. The method of designing an integrated circuit according to claim 8, wherein
said transaction inversion rate in said hardware power consumption estimation model shows the rate of change of a transaction having said desired transaction amount from a transaction temporally preceding immediately.

10. The method of designing an integrated circuit according to claim 8, wherein
said hardware power consumption estimation model further includes a correction factor for correcting said power consumption calculating equation, said correction factor being determined from a to-measurement ratio.

11. The method of designing an integrated circuit according to claim 8, further comprising the step of correcting an estimation result by multiplying an estimated power consumption of a yet-to-be-measured module among modules given said estimation of power consumption, by the ratio between an estimation and a measurement of power consumption of another module measured already.

12. A method of designing an integrated circuit, comprising:
a step (a) of designing architecture for establishing hardware-based functional modules and connections of said functional modules;
a step (b) of performing a transaction analysis on said functional modules and said connections;
a step (c) of floorplanning a configuration of hardware obtained from said transaction analysis; and
a step (d) of repeating the steps (a) to (c) to determine an optimum solution to hardware configuration.

13. The method of designing an integrated circuit according to claim 12, wherein
in the step (c), said floorplanning involves information of relative positions of said functional modules.

14. A method of designing an integrated circuit, comprising:

a step (a) of performing a transaction analysis on hardware-based functional modules in architecture of an integrated circuit and on connections of said functional modules;

a step (b) of calculating areas of said functional modules and areas necessary for said connections, based on the result of said transaction analysis;

a step (c) of performing floorplanning based on the areas of said functional modules and the areas necessary for said connections;

a step (d) of optimizing a circuit generated by said a floor planning toward smaller areas; and a step (e) of repeating the steps (a) to (d) before determining an optimum solution to hardware configuration and area.

15. The method of designing an integrated circuit according to claim 14, wherein the calculation of the areas necessary for said connections at the step (c) includes a process of determining appropriate bit sizes based on the result of said transaction analysis on said connections between said functional modules, and then determining layout wiring widths and layout interval sizes for use in layout design, corresponding to said bit sizes.

16. A method of designing an integrated circuit, comprising:

a step (a) of performing a transaction analysis on hardware-based functional modules in architecture of an integrated circuit and on connections of said functional modules;

a step (b) of calculating areas of said functional modules and areas for said connections, based on the result of said transaction analysis;

a step (c) of calculating the power consumption of each of said functional modules;

a step (d) of calculating a wiring capacitance from the areas for said connections and a per-unit-area capacitance of wiring for said connections, and calculating the power consumption of said connections between modules from this wiring capacitance and the numbers of transactions on said connections;

a step (e) of calculating the power consumption of the entire integrated circuit based on the calculations in the steps (c) and (d); and a step (f) of repeating the steps (a) to (e) before determining an optimum solution to hardware configuration, area, and power consumption.

17. The method of designing an integrated circuit according to claim 16, wherein the step (e) is followed by:

a step (g) of deciding whether or not the power consumption calculated in the step (e) is equal to or lower than a desired value of power consumption; and a step (h) of deciding, in the case where the power consumption calculated is higher than said desired value of power consumption in the step (g), whether or not functional module parallelization for power reduction is possible, and wherein if the decision in the step (h) shows that the functional module parallelization is possible, the functional module parallelization is performed, and if not, no operation is made before a return to the step (a).

18. The method of designing an integrated circuit according to claim 16, wherein the step (f) is followed by a step of designing power supply wiring, before determining an optimum solution to hardware configuration, area, and power consumption.

19. The method of designing an integrated circuit according to claim 16, wherein the step (e) includes:

a substep (e1) of estimating a design structure of a lower level based on design data of an upper level and a design constraint;

a substep (e2) of performing a function simulation on design data of said lower level; and a substep (e3) of estimating power consumption from operating information extracted by said function simulation and the design structure of said lower level.

20. The method of designing an integrated circuit according to claim 19, further comprising a step of determining elements for constituting a design data structure of said lower level and wiring widths for said connections from said operating information, the step coming after the substep (e1) and before the substep (e3), and wherein in the substep (e3), the power consumption is estimated with the elements for constituting the design data structure of said lower level and the wiring width for connection also taken into account.

21. A method of designing an integrated circuit, comprising:

a step (a) of performing a function simulation on design data of an upper level;

a step (b) of estimating a design structure of a lower level based on the design data of said upper level, operating information extracted by said function simulation, and a design constraint; and a step (c) of estimating power consumption from said operating information and the design structure of said lower level.

22. The method of designing an integrated circuit according to claim 21, wherein:

said upper level is a control data flow graph; and said lower level is a register-transfer logic (RTL) level.

23. The method of designing an integrated circuit according to claim 21, further comprising a step (k) of determining elements for constituting a design data structure of said lower level and wiring widths for connections from said operating information, the step (k) coming after the step (a) and before the step (c), and wherein in the step (c), the power consumption is estimated with the elements for constituting the design data structure of said lower level and the wiring width for connection also taken into account.

24. The method of designing an integrated circuit according to claim 23, wherein in the step (k), the number of register, the number of arithmetic units, the number of selectors, and the number of wires are determined as the elements for constituting the design data structure of said lower level.

* * * * *